April 10, 1951     M. J. BUERGER ET AL     2,548,344
PROCESS OF CEMENTING PLASTICALLY DEFORMABLE
BODIES AND PRODUCTS THEREOF
Filed Feb. 23, 1949
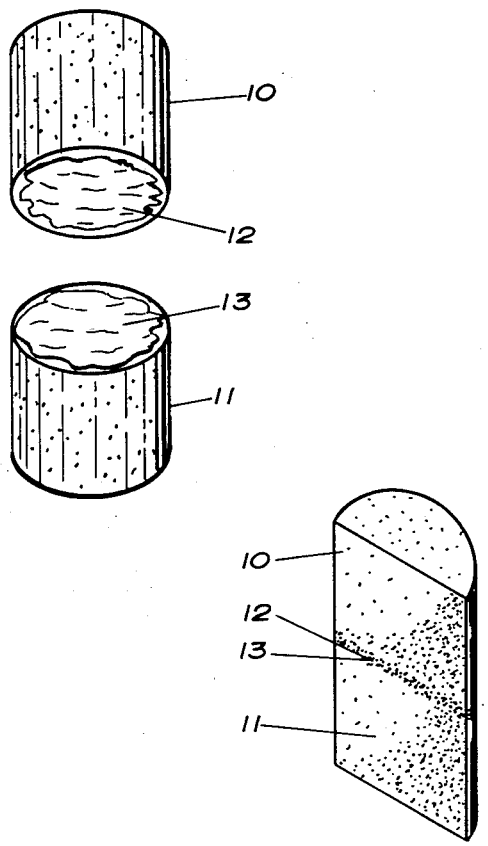
INVENTORS
MARTIN J. BUERGER
EDWARD WASHKEN
BY *Rule + Hoge*
ATTORNEYS Patented Apr. 10, 1951

2,548,344

UNITED STATES PATENT OFFICE 2,548,344

PROCESS OF CEMENTING PLASTICALLY DEFORMABLE BODIES AND PRODUCTS THEREOF

Martin J. Buerger, Lincoln, and Edward Washken, Cambridge, Mass., assignors to Owens-Illinois Glass Company, Toledo, Ohio, a corporation of Ohio Application February 23, 1949, Serial No. 78,012

11 Claims. (Cl. 154—122)

This invention relates to cementing two or more objects composed substantially of non-metallic inorganic plastically deformable crystals with a paste composed of inorganic plastically deformable crystals.

Many substances, including some inorganic, non-metallic materials, are characterized by having plastically deformable crystals. The designation "non-metallic" is intended to exclude not only metals but also those compounds having metallic characteristics (e. g. ready electrical conductivity such as the carbides). For a comprehensive discussion of plastically deformable materials see U. S. Patent to Buerger No. 2,362,430, issued Nov. 7, 1944.

In the ceramic art it is often desired to bond two ceramic materials together. This has been accomplished in the past by the use of adhesives or cements. The most successful cements include Bakelite and other organic resins as well as compounds such as sodium and ethyl silicate. But such materials are not stable at high temperatures, or are unsuitable for some purposes.

Accordingly it is an object to bond firmly ceramic bodies by means of a non-metallic inorganic plastically deformable binder which is stable at high temperatures.

In the accompanying drawings:

Fig. 1 is a perspective view of two cylinders which are to be joined together; and Fig. 2 is a perspective view of a segment of the joined cylinders.

It has now been found that a ceramic body 10 composed essentially or entirely of plastically deformable material may be cemented to another such body 11, the crystals of which are plastically deformable.

Briefly, the process of this invention consists in applying a thin coat or layer of a slurry 12 and 13 of finely divided, inorganic, non-metallic, plastically deformable material to that part of the surfaces to be united. Pieces or elements 10 and 11 which are to be united must be composed substantially entirely of non-metallic plastically deformable materials which have been molded or ground with sufficient pressure to cause plastic deformation, but which have not been heated sufficiently to cause substantial crystal growth.

The elements to be united, having been joined by the slurry are then heated to a temperature above that necessary to cause crystal growth and recrystallization in the non-metallic element and slurry and below that temperature which will induce a substantial degree of fluid or vitreous phase in any one. The finished article is a dense, solid, coherent body. The pressure and temperature conditions employed in molding the elements are such that they possess a specific gravity which approaches the theoretical for a voidless solid. In practice it has been found that a specific gravity of 75% of theoretical and preferably and more generally between 90% and 100% is satisfactory. That is, each of the elements has a specific gravity of at least 75% of the true specific gravity for that compound.

In order to understand this invention more fully, the following possible explanation is given, though the scope of this invention is not intended to be limited thereby.

Every material which is plastically deformable, when reduced to a fine powder and compressed sufficiently to cause plastic deformation, will, when heated above a critical temperature, experience a crystal growth. That temperature for calcium fluoride, for instance, is about 1710° F. Where more than one crystalline material is present in the final composition the material having the highest critical temperature at which crystal growth begins determines the minimum temperature to which the whole structure must be heated to form a firm bond. That is, if two objects are to be bonded, and one has a critical temperature of 1700° F. and the other of 1800° F., while the cementing composition has a critical temperature of 1825° F., the minimum temperature to which the composition must be heated is 1825° F. On the other hand, the temperature to which the total structure is subjected must be below that at which the plastically deformable material melts. That is, each of the crystalline materials pass through two states. With increasing temperature they first pass through a critical point after which crystal growth begins. If the temperature rises still further and above another point, the crystals begin to disappear and the material begins to assume a fluid state. The temperature of operation during the bonding process is confined to the temperature range between the critical point and that at which the fluid state occurs.

It is preferred to operate somewhat above the critical point (the point at which crystal growth begins) but below the melting point. Plastic deformation may be accomplished by applying pressure (in the order of 30 to 50 tons per square inch or greater) directly upon the material. Such pressure is sufficient to compact the mass to a specific gravity of at least 75% of the true specific gravity. It is surprising, however, that the simultaneous crystal growth in the elements will occur to such an extent that two separate pieces may be successfully bonded.

The time of heating varies somewhat depending upon the particular materials, temperature employed, and degree of subdivision of the materials, among other factors. Ordinarily heating from ½ to 3 hours is sufficient, but this time is not critical.

Broadly, this process is, therefore, applicable to bonding structures composed of inorganic nonmetallic plastically deformable crystals with bonding material composed of finely-divided inorganic plastically deformable crystals.

In a description of the process perhaps the simplest case to describe is that of bonding two molded calcium fluoride elements with the aid of finely divided calcium fluoride. The elements to be bonded are first compressed with a pressure of about 40 tons per square inch. The material used should be finely powdered—at least so that the entire amount would pass through 100 mesh or finer screen.

At times it is desired to heat the unfired elements before cementing to drive off volatiles and/or to remove gross structural strains. Such removal of volatiles and/or strains may be accomplished by treating the object with heat. But the heat applied must be less than that which will induce a substantial degree of crystal growth. Thus, molded calcium fluoride pieces may be held at a temperature below about 1700° F. for as much as three hours to relieve strains set up by molding and then be successfully bonded together; when the temperature of the molded elements is raised above the temperature at which crystal growth begins, a satisfactory bond may not be subsequently formed. The theory is that the deformed crystals with the aid of heat intercrystallize with the cementing material sufficiently to cause a tight bond. Recrystallization and crystal growth are essential to proper bonding.

Calcium fluoride very finely ground is made into a paste with the addition of water or other non-corrosive volatile substance and a thin layer applied to the surfaces to be joined. The molded bodies are assembled and subjected to a temperature of about 1950° F. for three hours. When cool, a firm bond is found to have been accomplished. If such a piece is cut in two with a diamond saw, the joint formed is found to be almost imperceptible.

Examples of non-metallic inorganic plastically deformable materials include calium fluoride (fluorite), magnesium oxide, anhydrite, beryllium oxide and aluminum oxide.

The paste is applied in any convenient way, as with a brush. The amount to be applied need only be enough to make a continuous structure as in any cementing operation, and may be applied either to one or both joining surfaces.

In all cases in the process of this invention, the temperature of heating must be below that which will produce a molten phase. Heating to such a temperature causes considerable shrinkage of the molded bodies thus producing inferior products.

Another example of the use of this invention is the bonding of magnesium oxide molded products with the use of magnesium oxide paste. Magnesium oxide ground to finer than 100 mesh was molded at 40 tons per square inch in the form of ⅝" diameter cylinders which were cemented together with an aqueous paste of U. S. P. light magnesia. The units were fired at 2600° F. for one-half hour. The bond formed was strong.

A similar procedure was followed in which beryllium oxide was molded at 40 tons per square inch, and cemented with a beryllium oxide paste. The units were fired at 2600° F. for ½ hour and a firm bond was obtained.

If preferred, the cement may be of a different chemical composition from one or both of the bodies to be joined. When the chemical composition of the cement and bodies to be joined differ, the temperature at which crystal growth begins in all of the compounds must be below that of the lowest melting point of any of the other crystalline materials.

The use of fine material is advised since it is found that with such material crystal growth may be more easily induced and continued, making both the bond and the products more resistant to mechanical forces. The fine crystalline material may be obtained in any convenient way. There are two methods which appear to be most practical. Grinding or otherwise mechanically reducing large crystals or aggregations of crystals to smaller crystals or aggregations is a preferred method although the small crystals may be obtined as by precipitation or by other processes such as volatilization.

This invention is a continuation-in-part of our copending application Ser. No. 621,376, filed October 9, 1945, now abandoned.

Advantages which may be secured by the use of this invention are numerous. It is, for instance, frequently desired to produce complex molded ceramic structures. Such structures may be constructed of simple elements which are cemented together by the material of these elements. When finished, the complex piece will be firmly bonded and all of one chemical composition having the same physical and electrical properties throughout.

We claim:

1. A dense coherent shaped article consisting of a plurality of initially separate compacted shaped elements composed of inorganic non-metallic crystals which are plastically deformable, said elements having a specific gravity of not less than about 75% of the true specific gravity of the compounds which constitute them, said shaped article being composed of separately shaped elements cemented together with finely-divided non-metallic inorganic crystals which are plastically deformable, said elements being bonded together by intercrystalline growth and being free from any substantial degree of molten or vitreous phase.

2. The product according to claim 1 wherein the cement is finely-divided calcium fluoride.

3. The product according to claim 1 wherein the entire shaped article is of one chemical substance.

4. The product according to claim 3 wherein the chemical substance is calcium fluoride.

5. The product according to claim 3 wherein the chemical substance is magnesium oxide.

6. The product according to claim 3 wherein the chemical substance is beryllium oxide.

7. The process of forming composite bodies from a plurality of initially separate elements, which comprises molding under pressure each of said elements by compressing a mass of finely-divided non-metallic inorganic plastically deformable crystals, said pressure being sufficient to impart to each said element a specific gravity of not less than about 75% of the true specific gravity of the crystals composing it, applying a thin layer of finely-divided plastically deformable inorganic non-metallic crystalline particles to at least one of each pair of surfaces to be bonded, assembling the elements into the final structure with said surface in contact with said layer between, and heating said assembled structure to a temperature between that at which crystal growth begins in each of said molded elements and in said layer, and that at which melting begins in the lowest-melting of any of said elements and said layer, said heating being continued until a firm bond between said elements is effected.

8. The process according to claim 7 wherein the elements are molded from magnesium oxide.

9. The process according to claim 7 wherein the elements are molded from beryllium oxide.

10. The process according to claim 7 wherein the elements are molded from calcium fluoride and wherein the assembled structure is heated to a temperature of from 1700° F. and 2400° F.

11. The process according to claim 10 wherein the elements are molded under a pressure sufficient to impart to each such element a specific gravity of not less than about 90% of the true specific gravity of the crystals composing it, and wherein the assembled structure is heated for from 1 to 3 hours.

MARTIN J. BUERGER.
EDWARD WASHKEN.

REFERENCES CITED

The following references are of record in the file of this patent:

UNITED STATES PATENTS

| Number | Name | Date |
|---|---|---|
| 1,573,315 | Griffin | Feb. 16, 1926 |
| 1,868,699 | Fulcher | July 26, 1932 |
| 1,873,362 | Tanberg | Aug. 23, 1932 |
| 2,038,034 | Fowler | Apr. 21, 1936 |
| 2,048,319 | Benner | July 21, 1936 |
| 2,257,136 | Smyth | Sept. 30, 1941 |
| 2,404,904 | Collins | July 30, 1946 |